UNITED STATES PATENT OFFICE.

JOHN WOOD, OF PEMBROKE, VIRGINIA, ASSIGNOR TO R. H. CHITWOOD, OF PEMBROKE, VIRGINIA.

OINTMENT.

1,383,896.  Specification of Letters Patent.  Patented July 5, 1921.

No Drawing.   Application filed September 1, 1920.   Serial No. 407,319.

*To all whom it may concern:*

Be it known that I, JOHN WOOD, a citizen of the United States, residing at Pembroke, in the county of Giles and State of Virginia, have invented certain new and useful Improvements in Ointments, of which the following is a specification.

This invention relates to ointments to be used in the treatment of hemorrhoids.

In preparing the ointment I proceed as follows:

| | |
|---|---|
| Life everlasting leaves (*Gnaphalium*) | 2 ounces. |
| Balm of Gilead buds (poplar buds) | 2 ounces. |
| Elder bark peeled down | 2 ounces. |
| Water | 3 pts. | are boiled down to a quart or until the mixture begins to get red. I then strain the mixture and to this I add one pound of mutton tallow or enough to make a quart of salve or ointment when boiled down. This mixture is boiled until it stops bubbling or the ingredients are completely dissolved. The salve or ointment is then ready for use.

While I have mentioned specific quantities of the ingredients in compounding the mixture, these may be varied to suit the quantity required, but substantially the proportions mentioned should be used.

When used, the parts to be treated are first bathed in water as hot as can be comfortably borne. These are then dried with a towel and then the salve is applied, in and around the rectum, four times a day for the first week and then once each day until relieved.

I claim as my invention:

1. An ointment made from life everlasting leaves, balm of Gilead buds, elder bark, water and mutton tallow, combined in substantially equal proportions.

2. An ointment made from life everlasting leaves, balm of Gilead buds, elder bark, water and mutton tallow, mixed in substantially the following proportions—2 ounces each of life everlasting leaves, balm of Gilead buds and elder bark, three pints of water, boiled and strained, and one pound of mutton tallow.

In testimony whereof, I have hereunto subscribed my name.

JOHN X WOOD.
(his mark)

Witnesses:
C. A. LUCAS,
W. J. SMITH.